United States Patent [19]

Yamaguchi

[11] Patent Number: 4,831,338

[45] Date of Patent: May 16, 1989

[54] SYNCHRONIZING CLOCK SIGNAL GENERATOR

[76] Inventor: Noboru Yamaguchi, 203 Isogo-Mansion, 11-15, Iosogodai, Isogo-ku, Yokohama-shi, Kanagawa-ken, Japan

[21] Appl. No.: 192,561

[22] Filed: May 11, 1988

[30] Foreign Application Priority Data

May 13, 1987 [JP] Japan ................................ 62-116494

[51] Int. Cl.$^4$ ............................................... H03L 7/08
[52] U.S. Cl. ..................................... 331/1 A; 331/25; 375/113; 375/120
[58] Field of Search .......................... 331/1 A, 18, 25; 375/111, 113, 120

[56] References Cited

U.S. PATENT DOCUMENTS 4,698,601 10/1987 Aizawa ................................ 331/1 A Primary Examiner—David Mis
Attorney, Agent, or Firm—Sughrue, Mion, Zinn, Macpeak & Seas

[57] ABSTRACT

A synchronizing clock signal generator has, in combination with a PLL circuit, a signal delay circuit for delaying a reference input signal by a prescribed time and issuing a reference signal, and a shift register receptive of the reference input signal and a clock signal which is an oscillation signal from a voltage-controlled oscillator or a signal produced by frequency-dividing the oscillation signal by an integer, for issuing a comparison signal in synchronism with the clock signal. The comparison signal and the reference signal are compared in phase. Even if the reference input signal is not a pulse signal of a fixed frequency, a synchronizing clock signal can be reproduced, insofar as the reference input signal is a pulse signal with its polarity inverted at the time of a multiple of a prescribed natural period.

2 Claims, 2 Drawing Sheets

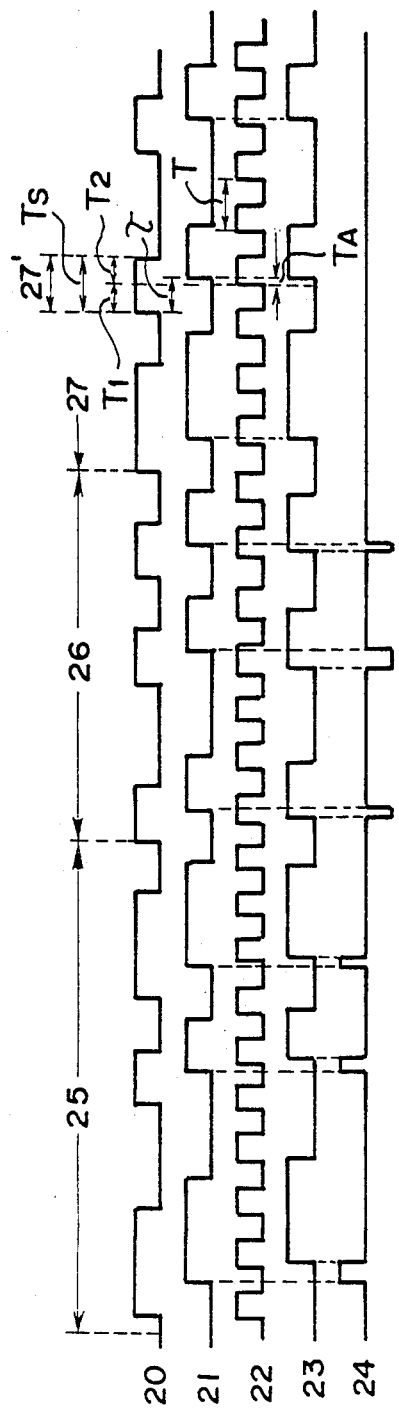

SYNCHRONIZING CLOCK SIGNAL GENERATOR

BACKGROUND OF THE INVENTION

1. Field of the Invention

The present invention relates to a device for reproducing a synchronizing clock signal from a series signal which has been modulated by coded modulation in synchronism with a clock signal of a prescribed period, the reproduced synchronizing clock signal being synchronous with the clock signal.

2. Description of the Prior Art

For transmitting digital data over a telephone line or a data line or recording digital data on a recording medium such as a magnetic disc, an optical disc, or the like, a practice widely used has been to modulate the digital data into a series signal encoded in synchronism with a clock signal of a prescribed period.

Examples of such encoding processes include NRZ (Nonreturn-to-Zero), NRZI (Nonreturn-to-Zero Inverted), PE (Phase Encoding), FM (Frequency Modulation), and MFM (Modified Frequency Modulation).

The signal encoded by these encoding methods is a code modulated by clock pulses (hereinafter referred to as a "bit clock") having a period equal to a data bit interval TB which is a time interval represenatative of one-bit data on a time-series basis. The interval of polarity inversion, the interval between positive-going edges, and the interval between negative-going edges of the encoded signal are each equal to a multiple of TB or TB/2.

For demodulating the encoded series signal to obtain the original data, it is often necessary to reproduce the bit clock used in the encoding process from the modulated signal. It is customary to reproduce clock pulses having the same period as that of the bit clock or a period equal to the period of the bit clock as divided by an integer, using a positive-going edge or a negative-going edge of a signal pulse, and to shift the phase of the reproduced clock pulses or frequency-divide the reproduced clock pulses to produce a demodulating synchronizing clock.

The synchronizing clock may typically be reproduced by one of the following two methods:

(1) A counter supplied as a clock input with a frequency that is a multiple (normally by 16 or 64) of that of the synchronizing clock is operated, and cleared by a positive-going edge or a negative-going edge of a signal pulse. The frequency-divided output of the counter is thus synchronized with the pulse signal edge, thereby reproducing the synchronizing clock.

(2) A bit clock insertion zone called a synchronizing field is provided in the initial portion of the modulated signal. A phase-locked loop circuit (hereinafter referred to as a "PLL circuit") is operated within the bit clock insertion zone to reproduce the synchronizing clock.

The circuit for carrying out the method (1) is very simple, but has problems in that jitter corresponding to one period of the clock input applied to the counter cannot be avoided, and the circuit tends to respond when the positive-going edge or negative-going edge of the modulated signal pulse is disturbed by noise.

The method (2) employs a feedback loop and has much better characteristics than those of the method (1) with respect to jitter and noise. However, this method requires a complex circuit since the synchronizing field is provided. Because synchronization is achieved basically only in the synchronizing field, a long-term nonsynchronous condition is apt to occur when a long continuous signal of more than several thousand bits is demodulated. This nonsynchronous condition has to be corrected by a suitable method.

SUMMARY OF THE INVENTION

In view of the aforesaid conventional problems, it is an object of the present invention to provide a device for generating a synchronizing clock without causing a long-term nonsynchronous condition even when demodulating a long continuous signal of more than several thousand bits, the device being resistant to jitter and noise.

Where a synchronizing clock is reproduced by using a conventional PLL circuit, it is necessary to provide a synchronizing field because a reference input signal of a constant frequency has to be applied. In view of this, an ordinary PLL circuit is combined with a signal delay circuit for delaying a reference input signal by a prescribed time and issuing a reference signal, and a shift register receptive of the reference input signal and a clock signal which is an oscillation signal from a voltage-controlled oscillator or a signal produced by frequency-dividing the oscillation signal by an integer, for issuing a comparison signal in synchronism with the clock signal. The comparison signal and the reference signal are compared in phase. With this arrangement, no synchronizing field is necessary, and long-term nonsynchronous condition is eliminated.

Even if the reference input signal is not a pulse signal of a fixed frequency, a synchronizing clock signal can be reproduced in synchronism with the reference input signal, as is the case with a conventional PLL circuit supplied with a signal of a constant frequency, insofar as the reference input signal is a pulse signal with its polarity inverted at the time of a multiple of a prescribed natural period.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a timing chart of operation of the device shown in FIG. 1.

DESCRIPTION OF THE PREFERRED EMBODIMENTS

Figure 1:
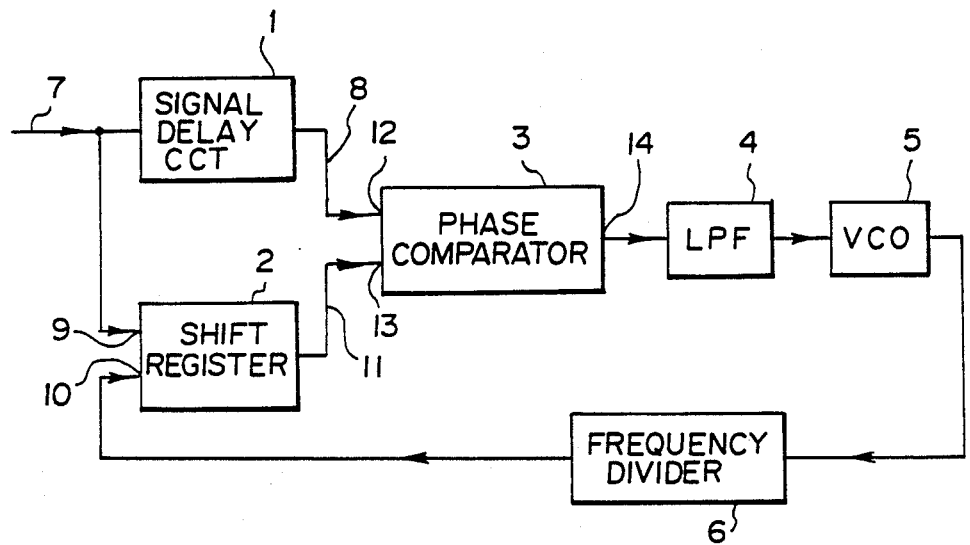
FIG. 1 is a block diagram of a device according to the present invention.

In FIG. 1, the arrowed lines represent signal lines, and the arrows indicate the directions in which signals are transmitted. A device or synchronizing clock signal generator according to the present invention includes a phase comparator 3, a low-pass filter 4, a voltage-controlled oscillator 5, and a frequency divider 6 (which may be omitted) which are components of a conventional PLL circuit. The synchronizing clock signal generator also includes a signal delay circuit 1 for delaying a reference input signal from a signal line 7 by a given period of time and for issuing the delayed reference signal to a signal line 8, and a shift register 2 for delaying the reference input signal applied to an input terminal 9 in synchronism with a clock signal applied to a clock input terminal 10 and for issuing a comparison signal to a signal line 11. The signal delay circuit 1 and the shift register 2 are respectively connected to input terminals 12, 13 of the phase comparator 3. The phase comparator 3, the low-pass filter 4, the voltage-controlled oscillator 5, the frequency divider 6, the signal delay circuit 1, and the shift register 2 jointly constitute a feedback loop which is stabilized when the reference signal applied to the input terminal 12 and the comparison signal applied to the input terminal 13 are in phase with each other.

Figure 2:
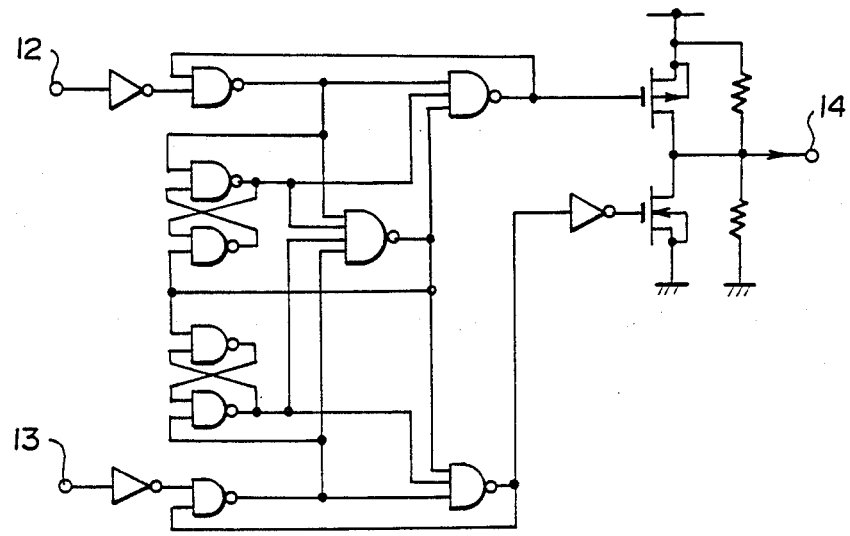
FIG. 2 is a block diagram of a phase comparator in the device of the present invention.

FIG. 2 shows, by way of example, a circuit arrangement that can be used as the phase comparator 3. The two input pulse signals, i.e., the reference signal and the comparison signal, are applied to the input terminals 12, 13 and compared with each other as to phase. A signal representative of the phase difference between the two input pulse signals is sent to an output terminal 14. The phase comparator 3 of the present invention is not limited to the illustrated structure, but should preferably be of the digital type and of the type in which synchronization is stablized if it is used in a conventional PLL circuit when the phase difference between the two input signals is zero.

FIG. 3 is an operation timing chart of the synchronizing clock signal generator. In FIG. 1, the oscillation frequency of the voltage-controlled oscillator 5 and the frequency-dividing ratio of the frequency divider 6 are selected such that the natural period Ts of a reference input signal 20 and the period T of a clock signal 22 after synchronization are equalized. The shift register 2 has a shift bit number n of 1 (equivalent to one D-type flip-flop), and is of the type which can be operated by a positive-going edge of a signal applied to the clock input terminal 10. The phase comparator 3 has the circuit arrangement shown in FIG. 2.

A reference signal 21 and a comparison signal 23 which are applied to the input terminals 12, 13 of the phase comparator 3 are compared in phase by the phase comparator 3. During a phase lagging zone 25, the phase of the comparison signal 23 lags behind the phase of the reference signal 21. Therefore, a positive pulse is issued as an output signal 24 from the phase comparator 3 to shift the oscillation frequency of the voltage-controlled oscillator 5 through the low-pass filter 4 toward a higher frequency, so that the period of the clock signal 22 becomes progressively shorter. In a phase leading zone 26, the phase of the comparison signal 23 leads the phase of the reference signal 21. A negative pulse is issued as an output signal 24 from the phase comparator 3 to progressively increase the period of the clock signal 22. In a synchronizing zone 27, the phase difference between the reference signal 21 and the comparison signal 23 is zero, and the waveforms of these two signals 21, 23 coincide with each other. The clock signal 22 is synchronized with the reference input signal 20, and serves as a synchronizing clock signal. Assuming that the signal delay circuit 1 has a delay time $\tau$, and the response delay time of the comparison signal 23 with respect to a positive-going edge of the clock signal 22 is TA, the time difference T1 between a positive-going edge of the clock signal 22 and a positive-going edge of the reference input signal 20 is of a constant value expressed by:

T1 = $\tau$ − TA.

Now, a natural period zone 27' equal to the natural period Ts of the reference input signal 20 in the synchronizing zone 27 will be considered. It is assumed that the time differences between the opposite ends of the natural period zone 27' and the positive-going edge of the clock signal 22 are indicated by T1, T2, respectively. No phase difference is produced between positive-going edges of the reference signal 21 and the comparison signal 23 if the positive-going edge of the clock signal 22 lies in the natural period zone 27'. The times T1, T2 therefore indicate time margins of positive- and negative-going edges of the reference input signal 20 with respect to jitter. Thus, when
T1 = T2,
the margin of the reference input signal 20 with respect to jitter is maximum. Based on this, a delay time $\tau$opt in which the margin of the reference input signal 20 with respect to jitter is maximum is determined as follows:

Since $$T1+T2=Ts=T, \quad T1=\tau-TA,$$
$$\tau opt = Ts/2 + TA = T/2 + TA \quad (1)$$

By applying the equation (1) to the case where the shift bit number of the shift register is n and $Ts = i \times T$ (i = 1, 2, 3, ...), $$\tau opt = (n - \tfrac{1}{2})T + TA \quad (2)$$

In view of the fact that T1 > 0, T2 > 0, the comparison signal is delayed by the time T each time the shift bit number of the shift register is incremented by 1, and this delay must be corrected by the delay time $\tau$, $\tau$ must be within the range of:

$$(n-1)T + TA < \tau < nT + TA \quad (3)$$

The signal delay circuit 1 thus serves to correct the time delay of the comparison signal caused by the shift register 2 and give an appropriate margin to the reference input signal with respect to jitter.

The value of $\tau$ which can practically be used is in the range of:

$$(n-0.75)T + TA < \tau < (n-0.25)T + TA \quad (4)$$

The margin of the reference input signal with respect to jitter is maximum when T is maximum, i.e., T = Ts. The circuit arrangement should preferably be designed to meet this condition. However, the present invention is not limited to this, and the design parameters may be determined in view of the degree of jitter of the reference input signal and the required margin.

In the illustrated embodiment, the PLL circuit is of a basic arrangement. However, almost any PLL circuit form may be employed in the present invention.

The synchronizing clock signal generator according to the present invention includes the signal delay circuit and the shift register added to the PLL circuit. Therefore, even if the reference input signal is not a pulse signal of a fixed frequency, a synchronizing clock signal can be reproduced, insofar as the reference input signal is a pulse signal with its polarity inverted at the time of a multiple of a prescribed natural period. The synchronizing clock signal generator is resistant to jitter and noise. No long-term nonsynchronous condition is developed even when demodulating a long continuous signal of more than several thousand bits.

Although a certain preferred embodiment has been shown and described, it should be understood that many changes and modifications may be made therein without departing from the scope of the appended claims.

I claim:

1. A synchronizing clock signal generator comprising:
    (i) a signal delay circuit for delaying a reference input signal by a prescribed time and issuing a reference signal;
    (ii) a phase comparator receptive of said reference signal and a comparison signal for issuing a signal representative of the difference in phase or frequency between said reference signal and said comparison signal;
    (iii) a low-pass filter for smoothing the signal applied thereto from said phase comparator;
    (iv) a voltage-controlled oscillator for issuing an oscillation signal with an oscillation frequency thereof being controlled by an output voltage from said low-pass filter; and
    (v) a shift register receptive of said reference input signal and a clock signal which is said oscillation signal or a signal produced by frequency-dividing said oscillation signal by an integer, for issuing said comparison signal in synchronism with said clock signal, the arrangement being such that when a pulse signal with its polarity inverted at the time of a multiple of a prescribed natural period is applied as said reference input signal, said clock signal is produced in synchronism with said reference input signal, said clock signal having a period equal to said natural period or said natural period as divided by an integer.

2. A synchronizing clock signal generator according to claim 1, wherein said signal delay circuit has a delay time $\tau$ in the range of:

$$(n-0.75)T+TA < \tau < (n-0.25)T+TA \quad (4)$$

where T is one period of said clock signal applied to said shift register, TA is a response delay time of the signal issued from said shift register with respect to a positive-going edge or a negative-going edge serving as a clock of said clock signal, and n is the shift bit number of said shift register.

* * * * *